United States Patent [19]
Muraski

[11] Patent Number: 5,568,914
[45] Date of Patent: Oct. 29, 1996

[54] COATED MAGNETIC TAPE CASSETTE SPRING

[75] Inventor: James T. Muraski, Gurney, Ill.

[73] Assignee: Jason, Inc., Milwaukee, Wis.

[21] Appl. No.: 515,703

[22] Filed: Aug. 16, 1995

Related U.S. Application Data

[63] Continuation of Ser. No. 287,851, Aug. 9, 1994, abandoned.

[51] Int. Cl.⁶ ............................................. F16F 1/18
[52] U.S. Cl. ............................................. 267/158
[58] Field of Search ................ 360/132; 242/197, 242/199, 360; 267/158, 160; 354/275; 29/173

[56] References Cited

U.S. PATENT DOCUMENTS

| | | | |
|---|---|---|---|
| 3,962,585 | 6/1976 | Huttner | 250/476 |
| 4,273,309 | 6/1981 | Morrison | 267/161 |
| 4,443,935 | 4/1984 | Zamba | 29/622 |
| 4,753,423 | 6/1988 | Ukai | 267/167 |
| 4,770,367 | 9/1988 | Carroll | 242/199 |
| 4,773,615 | 9/1988 | Carroll | 242/199 |
| 4,819,890 | 4/1989 | Carroll | 242/199 |
| 4,845,820 | 7/1989 | Carroll | 29/173 |
| 4,878,632 | 11/1989 | Carroll | 242/199 |
| 4,899,243 | 2/1990 | Bordignon | 360/132 |
| 4,903,916 | 2/1990 | Carroll | 242/199 |
| 4,974,791 | 12/1990 | Carroll | 242/199 |
| 5,005,780 | 4/1991 | Carroll | 242/199 |
| 5,046,683 | 9/1991 | Carroll | 242/199 |
| 5,079,815 | 1/1992 | Carroll | 29/173 |
| 5,205,547 | 4/1993 | Mattingly | 267/158 |
| 5,263,659 | 11/1993 | Carroll | 242/199 |

*Primary Examiner*—Robert J. Oberleitner
*Assistant Examiner*—C. T. Bartz
*Attorney, Agent, or Firm*—Welsh & Katz, Ltd.

[57] ABSTRACT

A magnetic tape cassette reel spring of ferromagnetic material such as mild steel with yield strength slightly greater than 100,000 psi coated with a impervious layer. Alloy steel and AISI constructional steels are also suitable. The coating inhibits contamination of the magnetic tape and may include nickel plate, zinc plate, lacquer, paint, varnish and polymer coatings. A method includes coating a steel sheet, slitting the sheet and stamping the spring configuration from the slit strips of the sheet.

22 Claims, 1 Drawing Sheet

COATED MAGNETIC TAPE CASSETTE SPRING

This application is a continuation of application Ser. No. 08/287,851 filed Aug. 9, 1994 (now abandoned).

FIELD OF THE INVENTION

This invention relates to magnetic tape cassettes and, in particular, to reel springs used within magnetic tape cassettes.

BACKGROUND

Magnetic cassette tapes are useful for the storage of a variety of information (i.e., analog or digital). Magnetic tape cassettes, for example, may be used to store information derived, inter alia, from such devices as video and/or audio recorders.

The medium used for the storage of information within a magnetic cassette tape is typically in the form of a flexible strip of a non-magnetic material (i.e., plastic or mylar) coated with particles of a magnetizable metal oxide. Information is recorded on the tape during use by passing the tape over a recording head which magnetizes the particles of the oxide in a manner representative of the information to be stored. During recordation of information, the tape is passed from a first reel of the cassette to a second reel.

A cassette housing (cassette) of a magnetic tape cassette provides an alignment and support structure for the two reels as well as a means for supporting, aligning and controlling the tape as it passes between the two reels during recordation and playback of the stored information. A reel spring is mounted within the cassette on a first side which engages and biases the reels towards an opposing side of the cassette.

To protect the tape of a magnetic tape cassette from stray sources of magnetism, prior art cassette enclosures and reels have been constructed of non-magnetic materials (i.e., plastic). To further protect the tape from magnetism, the prior art has taught that the reel springs must be constructed of a non-magnetic material such as stainless steel or aluminum. The prior art has taught that such practices were necessary for the reliable operation of magnetic cassette tapes.

While the prior art use of stainless steels and aluminum in the construction of reel springs has been effective, such materials are relatively expensive and difficult to work with. Because of the importance of magnetic cassette tapes a need exists for means of using a less expensive, more workable material for the construction of reel springs.

DETAILED DESCRIPTION OF A PREFERRED EMBODIMENT

The applicant has determined that ferromagnetic steel may be used for the construction of reel springs where the ferromagnetic steel is coated with an impervious material. The prior art has suggested that ferromagnetic steel could not be used because of the magnetism associated with such steels. The applicant, on the other hand, has determined that the difficulty in the use of ferromagnetic steels for the construction of reel springs lies in the generation of magnetic particles which detach themselves from the ferromagnetic steels and dispose themselves on the magnetic tape, thereby interfering with the function of the tape. The applicant has found that where a ferromagnetic spring is used in conjunction with a contamination containment system such as a coating of epoxy, that the utility of prior art reel springs may be preserved without the difficulty and expense associated with the prior art materials.

The generation of magnetic particles by ferromagnetic steels may be associated with any of a number of mechanisms. Corrosion may be one source, but is certainly not the only source. Other sources of magnetic particles from a reel spring include metallic scaling of the ferromagnetic steel due to flexing of an uncoated reel spring or wear during normal use. Since the applicant's invention reduces the generation of magnetic particles by sealing the surface, the applicant's invention is a contamination containment system, instead of a corrosion prevention system.

Figure 1:
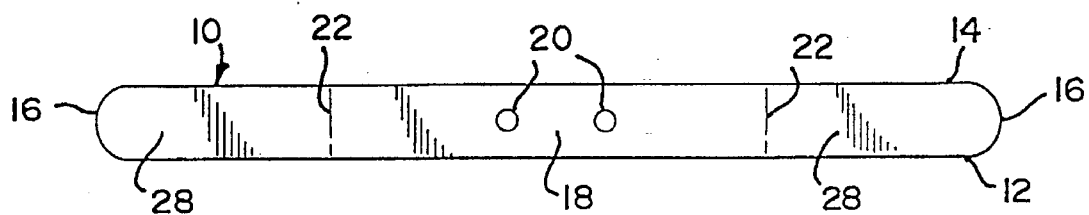
FIG. 1 is a plan view of a fabricated reel spring of a magnetic tape cassette in accordance with an embodiment of the invention.
Figure 2:
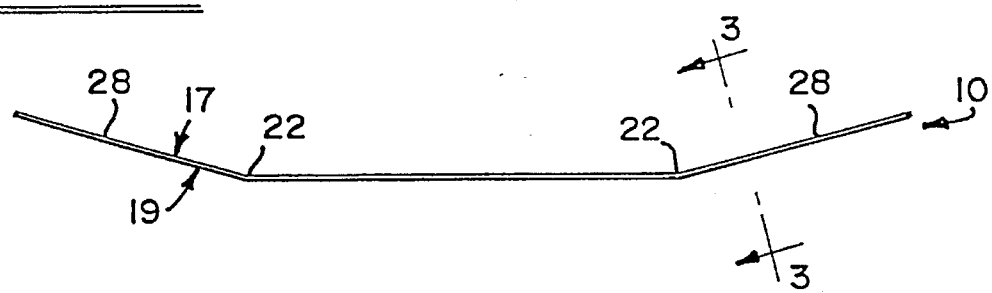
FIG. 2 is a side elevational view of the spring of FIG. 1.

FIGS. 1 and 2 show a reel spring 10 of a magnetic tape cassette in accordance with the present invention. Reel spring 10 is fabricated from mild steel with a coating 11.

The spring 10 is of a general shape as illustrated in U.S. Pat. Nos. 5,005,780 and 4,899,243, the disclosures of which are incorporated by reference. The invention, however, is applicable to any shape spring suitable for use as a reel spring within a magnetic tape cassette.

The spring 10 has generally rectangular configuration defined by first and second longitudinal edges 12 and 14. These edges extend virtually the entire length of the spring, parallel to a longitudinal centerline. The edges are joined by rounded tips 16. The spring perimeter thus defines top and bottom surfaces 17 and 19.

The spring 10 has a flat, central base portion 18 which is adapted to be joined to a cassette housing. A pair of holes 20 are formed in the base to facilitate attachment of the spring to the housing of a cassette.

In the preferred embodiment a pair of transverse crimps, or fold lines 22, determine the extent of the base portion. The base portion 18 terminates at the set of crimps 22 which provide a fulcrum point. These crimps 22 define end portions 28. The end portions are bent out of the plane of the base at an angle to the plane of the base. Preferably, this angle is about 17 degrees.

The set of crimps (and fulcrum points) are symmetric about the center of the spring. The thickness of the strip is about 0.010 to 0.016 inches and preferably about 0.012 inches. When the spring is at rest, the tips are intended to be located 0.390 inches above the base portion. The length of the spring 10 in the flat condition is 3.937 inches.

When the tips are deflected to a distance of 0.079 inches from the base, the spring is to exert a force on each side of about 140–200 grams. The width between the longitudinal edges 12 and 14 of a spring embodying the present invention ranges from 0.275 to 0.350 inches, sufficient to make a functional spring.

Figure 3:
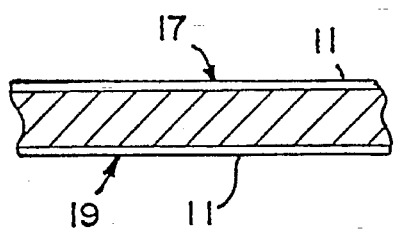
FIG. 3 is a cross-sectional view of the spring shown in FIG. 1 taken along the line 3—3 of FIG. 2.

In accordance with the present invention, top and bottom surfaces 17 and 19 are coated with a coating 11 best seen in cross-section in FIG. 3. This coating envelopes the surface and seals in metallic particles adhering to the surface. The coating and enveloped particles together form a contamination containment system which protects the magnetic tape from contamination.

Unlike known magnetic tape cassette springs, the spring 10 is made of ferromagnetic steel, such as mild steel. It is comtemplated that steel having a yield strength in excess of 100,000 psi will be suitable to this invention. Alloy steel, and AISI constructional steels which are ferromagnetic are also considered suitable to this invention.

Coating 11 may consist of a number of materials such as nickel plate, chrome plate or zinc plate. Lacquer, zinc rich paint or aluminum rich paint, varnishes, epoxy, or polymer coatings including a number of alternate polymer coatings which are impervious to the passage of contaminants from the spring surface through the coating are also considered acceptable. The coating must, of course, be sufficiently flexible to permit the spring to function without damage to the coating.

The purpose for constructing a cassette with a ferromagnetic coated steel is to provide a reel spring which is more economical to manufacture based on material cost and forming characteristics. It is intended for limited life cassettes. Such cassettes are not commonly used for pre-recorded material that is to be preserved for repeated use over an extended period. Rather, they are best suited for limited duty and used in communication of, for example, advertising and promotional materials.

The spring 10 is preferably made from slit-to-width strip which is slit from a coil of material. To form springs, the strips may be fed into a press in the process disclosed an U.S. Pat. No. 4,845,820, the disclosure of which is incorporated by reference.

It is contemplated that steel sheet is first coated and then slit and de-gaussed. Any suitable known process may be used to coat the sheet. While top and bottom surfaces 17 and 19 will be coated, longitudinal edges 12 and 14 may be uncoated. Rounded tips 16 would also be uncoated since they are formed in the stamping process. At least 90% of the exposed surface area of the spring is coated. Preferably, about 95% to 98% is coated. It is contemplated that the coating could be of the type that "heals" scratches, such as galvanizing, which oxidizes to protect exposed edges. The critical factor is to avoid formation of particulate oxidization which is dislodged from the spring on flexure. Such particulate matter would have an adverse affect on performance of the magnetic medium. While it is felt that no adverse consequences would result from the uncoated edges, an alternative would be to coat each spring after forming.

Various features of the invention have been shown and described. It is contemplated, however, that various modifications may be made without departing from the scope of the invention.

I claim:

1. A reel spring for a magnetic tape cassette comprising an elongated strip of metal including a base portion adapted for coupling to an inside surface of a cover of the magnetic tape cassette and at least one leg portion extending out of the plane of the base for resiliently engaging a reel of the magnetic tape cassette, said spring being formed from ferromagnetic steel with a contamination coating disposed over an outer surface of the spring substantially enclosing and containing contamination from the spring.

2. A reel spring as claimed in claim 1 wherein said spring is made of mild steel with a yield strength in excess of 100,000 psi.

3. A reel spring as claimed in claim 2 wherein said spring material is selected from the group comprising mild steel, alloy steel, and AISI constructional steel.

4. A reel spring as claimed in claim 1 wherein said contamination coating of the spring further comprises an impervious material extending over 90% of its surface area.

5. A reel spring as claimed in claim 4 wherein said coating covers at least 98% of the surface area of the spring.

6. A reel spring as claimed in claim 4 wherein said coating is selected from the group comprising nickel plate, chrome plate, or zinc plate.

7. A reel spring as claimed in claim 4 wherein said coating is selected from the group comprising lacquer, paint, zinc rich paint, aluminum rich paint, varnish, epoxy, and polymer coatings.

8. A reel spring as claimed in claim 6 wherein said spring is made of mild steel with a yield strength in excess of 100,000 psi.

9. A reel spring as claimed in claim 6 wherein said spring material is selected from the group comprising mild steel, alloy steel, and AISA constructional steel.

10. A reel spring as claimed in claim 7 wherein said spring is made of mild steel with a yield strength in excess of 100,000 psi.

11. A reel spring as claimed in claim 7 wherein said spring material is selected from the group comprising mild steel, alloy steel, and AISA constructional steel.

12. A reel spring as claimed in claim 1, wherein said spring comprises:

an elongated strip of metal having generally parallel longitudinal edges and being of a width of between 0.300 and 0.350 inches and a thickness of between 0.010 and 0.016 inches.

13. A reel spring as claimed in claim 2, wherein said spring comprises:

an elongated strip of metal having generally parallel longitudinal edges and being of a width of between 0.300 and 0.350 inches and a thickness of between 0.010 and 0.016 inches.

14. A reel spring as claimed in claim 3, wherein said spring comprises:

an elongated strip of metal having generally parallel longitudinal edges and being of a width of between 0.300 and 0.350 inches and a thickness of between 0.010 and 0.016 inches.

15. A reel spring as claimed in claim 4, wherein said spring comprises:

an elongated strip of metal having generally parallel longitudinal edges and being of a width of between 0.300 and 0.350 inches and a thickness of between 0.010 and 0.016 inches.

16. A reel spring as claimed in claim 5, wherein said spring comprises:

an elongated strip of metal having generally parallel longitudinal edges and being of a width of between 0.300 and 0.350 inches and a thickness of between 0.010 and 0.016 inches.

17. A reel spring as claimed in claim 6, wherein said spring comprises:

an elongated strip of metal having generally parallel longitudinal edges and being of a width of between 0.300 and 0.350 inches and a thickness of between 0.010 and 0.016 inches.

18. A reel spring as claimed in claim 7, wherein said spring comprises:

an elongated strip of metal having generally parallel longitudinal edges and being of a width of between 0.300 and 0.350 inches and a thickness of between 0.010 and 0.016 inches.

19. A reel spring as claimed in claim 8, wherein said spring comprises:

an elongated strip of metal having generally parallel longitudinal edges and being of a width of between 0.300 and 0.350 inches and a thickness of between 0.010 and 0.016 inches.

20. A reel spring as claimed in claim 9, wherein said spring comprises:

an elongated strip of metal having generally parallel longitudinal edges and being of a width of between 0.300 and 0.350 inches and a thickness of between 0.010 and 0.016 inches.

21. A reel spring as claimed in claim 10, wherein said spring comprises:

an elongated strip of metal having generally parallel longitudinal edges and being of a width of between 0.300 and 0.350 inches and a thickness of between 0.010 and 0.016 inches.

22. A reel spring as claimed in claim 11, wherein said spring comprise:

an elongated strip of metal having generally parallel longitudinal edges and being of a width of between 0.300 and 0.350 inches and a thickness of between 0.010 and 0.016 inches.

\* \* \* \* \*

UNITED STATES PATENT AND TRADEMARK OFFICE
CERTIFICATE OF CORRECTION

PATENT NO. : 5,568,914
DATED : Oct. 29, 1996
INVENTOR(S) : Muraski

It is certified that error appears in the above-indentified patent and that said Letters Patent is hereby corrected as shown below:

<u>In the Abstract:</u> Item [57],

Line 3, change "a" to "an".

Col. 2, line 61, change "envelopes" to "envelops".
Col. 3, line 25, change "an" to "in".

Col. 4, line 15, change "AISA" to "AISI".
Col. 4, line 21, change "AISA" to "AISI".

Signed and Sealed this

Twenty-second Day of April, 1997

*Attest:*

BRUCE LEHMAN

*Commissioner of Patents and Trademarks*

*Attesting Officer*